(12) United States Patent
Loniewski et al.

(10) Patent No.: US 9,701,546 B2
(45) Date of Patent: Jul. 11, 2017

(54) WATER FILTRATION DEVICE AND FILTER THEREFOR

(71) Applicants: Grzegorz Loniewski, Mount Prospect, IL (US); Scott Anthony Nightlinger, Arlington Heights, IL (US); Agnieszka Monika Loniewska, Mount Prospect, IL (US); Piotr Loniewski, Warsaw (PL)

(72) Inventors: Grzegorz Loniewski, Mount Prospect, IL (US); Scott Anthony Nightlinger, Arlington Heights, IL (US); Agnieszka Monika Loniewska, Mount Prospect, IL (US); Piotr Loniewski, Warsaw (PL)

( * ) Notice: Subject to any disclaimer, the term of this patent is extended or adjusted under 35 U.S.C. 154(b) by 783 days.

(21) Appl. No.: 14/101,270

(22) Filed: Dec. 9, 2013

(65) Prior Publication Data

US 2014/0158602 A1    Jun. 12, 2014

Related U.S. Application Data

(60) Provisional application No. 61/735,269, filed on Dec. 10, 2012.

(51) Int. Cl.
| | | |
|---|---|---|
| C02F 1/00 | (2006.01) |
| C02F 1/28 | (2006.01) |
| C02F 101/20 | (2006.01) |
| C02F 101/36 | (2006.01) |

(52) U.S. Cl.
CPC .............. *C02F 1/003* (2013.01); *C02F 1/283* (2013.01); *C02F 2101/20* (2013.01); *C02F 2101/36* (2013.01); *C02F 2201/004* (2013.01); *C02F 2201/006* (2013.01); *C02F 2303/02* (2013.01); *C02F 2303/04* (2013.01); *C02F 2307/06* (2013.01)

(58) Field of Classification Search
CPC ...... C02F 1/003; C02F 1/283; C02F 2101/20; C02F 2101/36; C02F 2307/06; C02F 2201/006; C02F 2303/02; C02F 2303/04; C02F 2201/004
USPC ...................... 210/236, 449, 446; 4/675–678
See application file for complete search history.

(56) References Cited

U.S. PATENT DOCUMENTS

| | | |
|---|---|---|
| 5,510,031 A | 4/1996 | Knauf et al. |
| 6,464,871 B1 | 10/2002 | Chang |
| 6,532,982 B2 | 3/2003 | Downer |
| 6,641,727 B1 | 11/2003 | Aldred et al. |

(Continued)

*Primary Examiner* — Madeline Gonzalez
(74) *Attorney, Agent, or Firm* — John C. Shepard (57) ABSTRACT

The present invention is a water filtration device in the form of a filter faucet that includes a faucet body, a water delivery spout, and a removable filter that is readily accessible for quick and easy replacement in a generally pull-out and push-in manner. The filter is attached to the faucet body water outlet, and the water delivery spout is attached to the filter outflow port. The filter is swivable in relation to the faucet body while maintaining a watertight connection. Whereby the water delivery spout being affixed to the filter outflow port, in an embodiment, may be readily and conveniently positioned in a desired direction. The invention also provides a replacement kit that includes a generally inline water filter suitable for forming a water filtration device in conjunction with a water faucet body.

25 Claims, 9 Drawing Sheets

(56) References Cited

U.S. PATENT DOCUMENTS

| | | | |
|---|---|---|---|
| 7,354,513 B2 * | 4/2008 | Nightlinger | B01D 35/04 210/232 |
| 8,372,275 B2 | 2/2013 | Lackey et al. | |

* cited by examiner

WATER FILTRATION DEVICE AND FILTER THEREFOR

CROSS-REFERENCE TO RELATED APPLICATIONS

This application incorporates by reference and claims priority to U.S. Provisional Patent Application No. 61/735,269 filed Dec. 10, 2012.

BACKGROUND OF THE INVENTION

This invention generally relates to residential countertop water treatment and filtration devices for improving the quality of potable water. More particularly, it relates to a countertop water filtration device that includes a water filter often alternatively defined as a cartridge, filter element, or filter unit.

U.S. Pat. Nos. 5,510,031, 6,464,871, 6,532,982, 6,641,727 provide examples of such prior art filter faucet assemblies. These filter faucet devices are mostly complex, expensive, and contain filter elements or cartridges that can be difficult and messy to replace by end users not mechanically inclined. Several would require extensive modifications to the sink structure.

These prior art filter faucets require partial disassembly when replacing the filtering element. Several of these devices further introduce the potential risk of water leakage under the sink or countertop, which may easily go undetected by a user who accesses the filtration device from above and thus may not be aware of any potential leakage under the counter where the main body and the pressurized housing are located. U.S. Pat. No. 8,372,275 teaches an embodiment intended to reduce this complexity, however it has created new nuisances involving a complex base with a large footprint on a sink or countertop and an inefficient filter element with a short lifespan requiring relatively frequent replacement, thus being expensive and inconvenient in use.

Therefore, the need exists for a simple yet durable surface-mounted countertop water filtration device that corrects and overcomes the disadvantages of the prior art, is inexpensive in use, and can take advantage of a standard sink structure for attachment. The need also exists for a replaceable filter that is inexpensive, long lasting, and readily accessible for quick and easy replacement without any tools.

BRIEF SUMMARY OF THE INVENTION

It is an objective of the present invention to provide a reliable, long-lasting, and inexpensive water filtration device that corrects and overcomes the disadvantages and problems of the prior art.

In an exemplary embodiment, in accordance with the present invention, the water filtration device is in the form of a water filter faucet of the type generally installed in the kitchen or similar environment on a sink, countertop, or similar surface comprising a predetermined mounting hole therethrough.

The filter faucet includes a faucet body having a water outlet configured as a vertically oriented spout-receiving socket fitting, and a filter cartridge being substantially a disposable inline water filter having an inflow port in one end and an outflow port in an opposite second end, and a water delivery spout having a generally tubular inlet end. The faucet body includes a valve for controlling water flow through the water outlet. The faucet body also incorporates a water inlet means and an attachment means extending downwardly from the body through the mounting hole when installed, for a water supply connection and for fastening to the mounting surface. The filter cartridge includes an elongated tubular stem alternatively defined as an adapter for engagement with the faucet body water outlet socket fitting. The stem is sized to fit the faucet body socket fitting in a generally push-in manner for a watertight connection of the filter with the faucet body. The stem enables the filter to be swivable in relation to the faucet body while maintaining the watertight connection between the filter and faucet. Thus, the spout may be readily and conveniently positioned in a desired direction when affixed to the filter outflow port.

The filter cartridge is readily accessible for quick and easy replacement. The replacement process does not require any tools because the filter cartridge is readily interchangeable in a pull-out and push-in manner.

The invention also provides a replacement kit. In an exemplary embodiment, the replacement kit includes an improved disposable inline water filter suited for new use as a filter cartridge and a substantially tubular stem being either attached or not attached to an inlet end of the inline water filter. The kit may further include a water dispensing spout being attached or not attached to the outflow port of the improved inline water filter.

The invention also provides a disposable water filter suitable for forming a water filtration device in conjunction with a water faucet body.

In an exemplary embodiment in accordance with the present invention, the disposable inline filter is improved for new use as a component of the water filter faucet. The cartridge has a cylindrical side wall and two generally opposing ends with an interior chamber containing water treatment media. A tubular stem extends from the first end. The stem serves for operatively engaging and fluidly connecting the filter with the outflow port fitting of the water faucet body. The stem slidably engages the faucet outflow port when installed. The stem allows to hold the cartridge in a generally upright position. The cartridge further includes an outflow port, generally situated in the second end. The outflow port comprises a fitting for operatively engaging a tubular inlet end of the water delivery spout. Generally, the filter outflow port fitting is a socket fitting suitable for watertight engagement with the water delivery spout inlet end.

The combination of the alternative faucet body embodiments, the alternative filter cartridge embodiments, the alternative stem or adapter embodiments, and the alternative water delivery spout embodiments substantially constitute the water filtration device of the present invention.

The present invention provides a water filtration device having several unique advantages, superior features, and inherent benefits.

The filter is slidably and frictionally engaged with the faucet body in a manner enabling the filter to be swivable in relation to the faucet body, thereby allowing the affixed spout to be readily positioned in a desired direction.

The filter may be readily installed and replaced in a quick and easy push-in and pull-out manner.

A filter generally in the form of an inline filter may be used as a cartridge that may possess any of numerous possible dimensions; wherein height, diameter, and general shape are non-specific.

Additional features and advantages of the present invention are described in, and will be apparent from the detailed description of the presently preferred embodiments and from the drawings.

BRIEF DESCRIPTION OF THE SEVERAL VIEWS OF THE DRAWING

The features of the present invention will become more readily apparent and further understood by reference to the following drawings.

Sheet 1.

Sheet 1.

Sheet 1.

Sheet 1.

Sheet 1.

Sheet 2.

Sheet 2.

Sheet 2.

Sheet 2.

Sheet 2.

Sheet 2.

Sheet 3.

Sheet 4.

Sheet 4.

Sheet 4.

Sheet 5.

Sheet 5.

Sheet 6.

Sheet 7.

Sheet 7.

Sheet 7.

Sheet 8.

Sheet 8.

Sheet 9.

Sheet 9.

PART NUMBERS OF THE DRAWINGS 100 faucet body
110 valve
120 fluid passage
121 latchkey
130 fluid outflow port
131 fitting, socket fitting
132 compression ring
133 packing sleeve
134 compression nut
135 tubular socket fitting
136 inner threaded portion
138 frontal surface
150 means, shank
155 fitting
160 nut
170 stem
172 threaded portion
175 seal, sealing ring
180 valve actuator
200 filter, filter cartridge
210 watertight shell
211 shell sidewall
215 media chamber
216 media
217 felt disc
220 first end, inlet end
221 fluid inflow port
222 reduction fitting
223 receiving socket
224 inner abutment
225 socket fitting
226 threaded fitting
227 inner wall
228 threaded portion
229 wall
230 second end, outlet end
231 fluid outflow port
235 socket fitting
236 abutment, stop shoulder 237 inner wall
250 quick-connect fitting
251 collet
252 resilient collet arms
253 cam surface
254 bushing
255 collet flange, shoulder
256 gripping element, teeth
257 sealing ring
258 inner bushing
259 inner abutment
300 adapter, stem
310 fluid passage
320 proximal end, head
321 gripping ring
322 sealing ring
323 stop ring
324 pipe taper thread
325 collar
326 stop ring
327 wall
329 contact surface
330 distal end, stem portion
331 annular groove, notch
332 sealing ring
333 threaded portion
400 faucet spout
410 fluid inflow end
411 sealing ring
412 groove, notch
600 sink, countertop
650 mounting hole

DETAILED DESCRIPTION OF THE INVENTION

Exemplary embodiments of the inventive water filtration device alternatively defined as a water filter faucet are shown in the accompanied drawings. In general, each embodiment includes a faucet body 100, a water filter 200 alternatively defined as a filter cartridge, a water delivery spout 400, and a substantially tubular elongated stem 300 alternatively defined as an adapter engaged with the filter cartridge.

Figure 1:
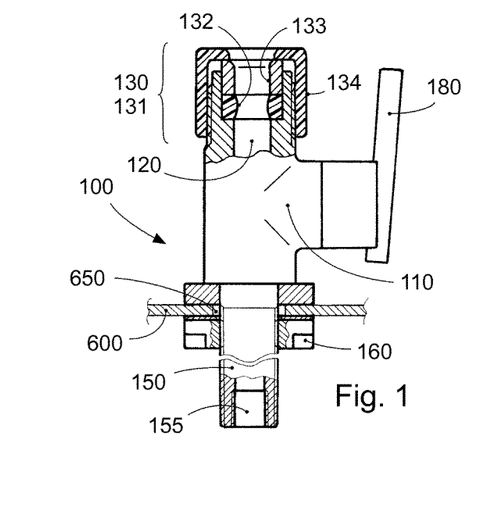
FIG. 1 is an elevational view partially in section, of a water faucet body that is suitable to be coupled with the filter cartridge illustrated in FIG. 2 to form a filter faucet.
Figure 2:
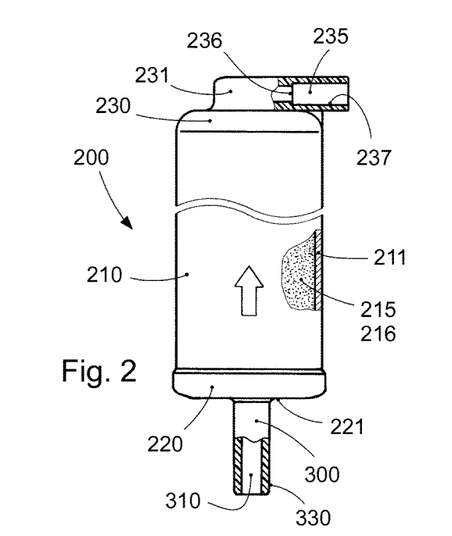
FIG. 2 is an elevational view fragmentary in section, of an inline filter cartridge for a water filter faucet, according to the invention.
Figure 3:
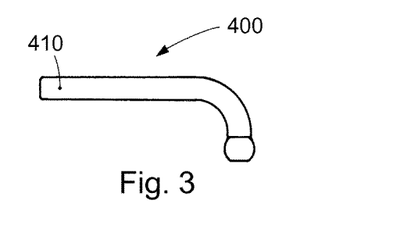
FIG. 3 is a plan view showing a water delivery spout which is suitable to be engaged with the filter cartridge of FIG. 2.
Figure 4:
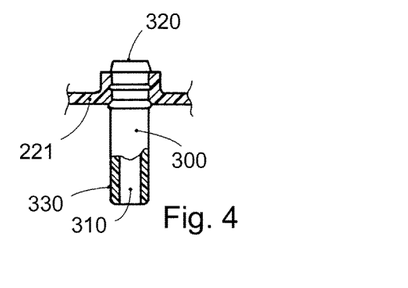
FIG. 4 is a fragmentary cross-sectional view of the filter fluid inflow port showing how the adapter of FIG. 5 is engaged with the filter cartridge of FIG. 2.
Figure 5:
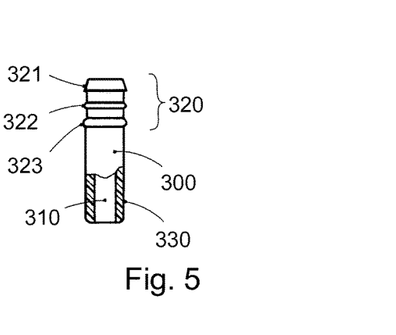
FIG. 5 is an elevational view partially in section, of the adapter included in the structure of the filter cartridge shown in FIG. 2.

Referring now to the drawings, FIGS. 1, 2, and 3 depict the main components of the water filtration device. FIG. 1 shows a faucet body 100, FIG. 2 shows a water filter cartridge 200, and FIG. 3 shows a water delivery spout 400. The faucet body is shown operatively mounted on a sink surface 600 having a mounting hole 650 therethrough. The faucet body 100 has a water flow control valve 110 having a handle 180 suited for manual valve actuation between the open and closed positions, a fluid outflow passage 120, and a spout-receiving socket fitting 131 incorporated in a water outlet or outflow port 130. The socket fitting is substantially cylindrical and has the inner diameter of about ⅜ inch and a depth of about 1 inch. The faucet body also incorporates a hollow threaded shank 150. The faucet body and the threaded shank may be formed as an integral whole from the NSF listed, FDA approved materials such as polysulfone (ACETAL, CELCON) using an injection molding process. Another suitable plastic material such as polyvinylidene fluoride (KYNAR), polypropylene, or metal alloy materials such as bronze, stainless steel or lead free brass may be utilized to form the faucet body. The threaded shank 150 incorporates a fastening nut 160 and a water connection fitting 155. The shank has the outer diameter of about 13/16 inch and a length of about 3 inches. The water connection fitting 155 is a threaded fitting ¼-18 NPT (National Pipe Thread). The shank has ½-14 straight pipe thread. The shank's outer thread may equally be used to form a water supply connection with a reinforced flexible polymeric hose or a similar conduit. The faucet body socket fitting 131 combines an annular rubber compression ring 132, a packing sleeve 133, and a compression nut 134 forming a socket compression tube fitting. The annular compression ring 132 may be formed from other suitable resilient sealing materials; for example Buna-N, Viton, Silicon, or similar material known in the art. The compression nut 134 and packing sleeve 133 are formed using an injection molding process from acrylonitrile butadiene styrene (ABS), but a plastic such as polysulfone (Acetal), polypropylene, or nylon may be equally utilized. The faucet outflow port socket compression fitting 131 receives the hollow tubular stem 300. The rotatable compression nut 134 having a digitally engaging outer surface suitable for finger operation (not shown) allows for regulating the frictional engagement and watertight seal between the compression ring 132 and the tubular stem 300. The filter cartridge 200 shown in FIG. 2 is substantially a disposable inline water filter. The cartridge has a watertight shell 210 including a cylindrical wall 211 about a central longitudinal axis (not shown) with a first end 220 and a second end 230 forming an interior media chamber 215, containing a water treatment media 216. A partial cutaway view of the watertight shell shows the wall 211 and the water filtration media 216 contained within the media chamber 215. The media chamber 215 is filled with a selected filtration media 216 such as granulated activated carbon secured at the inlet and outlet end with felt discs 217 (shown in FIG. 15) made from polypropylene with 20 micron nominally rated pore size (in this embodiment). Various pore sizes being suitable for this purpose, for example 5 or 10 microns. Generally the two felt discs placed at the cartridge ends secure the granulated filtration media in place. The water treatment media 216 being exemplified as a granulated activated carbon for reducing chlorine and odor causing contaminants may be replaced by a carbon block filter element or other types of filtration media known in the art for removing lead and mercury, and further for removing, killing, or inactivating microorganisms such as bacteria, viruses, cyst, protozoa, and the like. The cartridge's first end 220 having an inlet port 221 includes an elongated tubular stem 300 alternatively defined as an adapter being engaged with the inlet port 221. The stem or adapter 300 is sized to fit the faucet body socket fitting 131 in a generally push-in manner. The adapter 300 as shown best in FIG. 5 may comprise a head portion 320 and a cylindrical stem portion 330. A passage 310 formed along the stem portion and the head portion is in fluid communication with the faucet body 100 fluid outflow passage 120 and the cartridge 200 media chamber 215 (not shown in details). The stem or adapter 300 being formed from Acetal (Celcon) using an injection molding process, has an outer diameter of about ⅜ inch and a length of about 1⅜ inch. The stem portion 330 extending about one inch from the inlet port 221 has a smooth cylindrical outer surface suitable to be inserted in a push-in manner directly into the compression socket fitting 131 of the faucet body outflow port 130, and may be securely tightened with the nut 134. The head portion 320 is formed with an annular gripping ring 321, sealing ring 322, and stop ring 323 and is press fit into the cartridge's first end fluid inflow port 221 during the manufacturing process. FIG. 4 shows the stem 300 being inserted into the cartridge inflow port 221 of the first end 220. The stem portion 330 extending from the cartridge first end 220 provides a significant structural support for holding the cartridge 200 in a generally vertical position. The stem portion 330 operatively inserted in the valve body socket and the head portion 320 secured in the cartridge inflow port 221 have to absorb any potential moderate side impact to the cartridge 200 that may occur during sink work activity while maintaining the cartridge in its operational upright position. The cartridge's second end 230 being formed as integral whole with the cylindrical wall 211 in an injection molding process comprises a filtered water outflow port 231. The outflow port 231 has a fitting 235 suitable for engaging an inflow end 410 of the water delivery spout 400 shown best in FIG. 3. The generally horizontally formed socket fitting 235 is shown having an inner abutment or stop shoulder 236 and a smooth inner cylindrical wall 237 pre-sized to fit the tubular spout inlet end 410. The water delivery spout 400 may be made of a ⅜" OD (outer diameter) plastic tube, bent, and shaped for conveniently and easily delivering the treated water. Operatively, the spout inflow end 410 is lightly press-fit into the filter cartridge outflow port 231 socket fitting 235. The spout 400 may be provided for convenience with the inventive filter cartridge 200 in the attached form or as a separately loose piece requiring assembly. The generally cylindrical shell 210 formed integrally with the second end 230 and the separate first end 220, both formed from polypropylene using an injection molding process and are joined together in a process known as "spin welding" forming a reliable watertight connection. The connection between the spout 400 and the filter cartridge 200, and between the stem 300 and the filter cartridge, and between the stem and the faucet body outflow port, may have numerous alternative forms; some of which are shown and described in further example embodiments.

The combination of the alternative faucet body 100 embodiments, the alternative filter cartridge 200 embodiments, the alternative stem or adapter 300 embodiments, and the alternative water delivery spout 400 embodiments constitute the water filtration device of the present invention.

Figure 6:
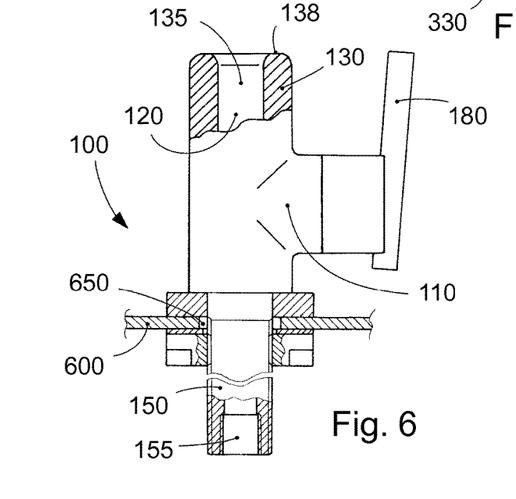
FIG. 6 is an elevational schematic view partially in section, of a water faucet body that may be coupled with the filter cartridge shown in FIG. 7 to form a water filter faucet.
Figures 7, 8, 9, 9A:
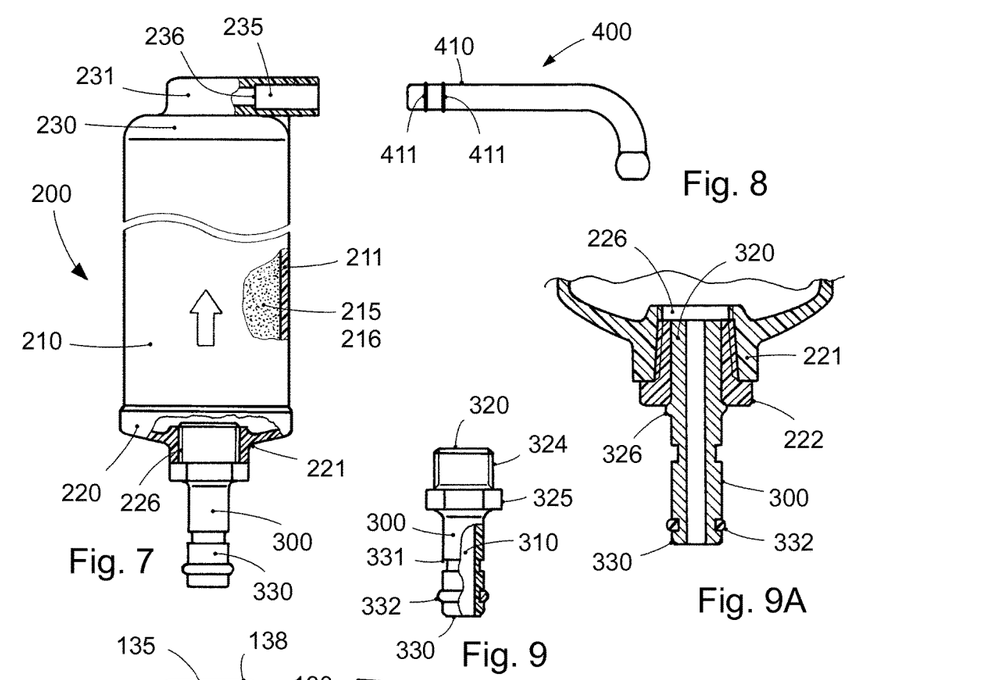
FIG. 7 is an elevational view fragmentary in section, showing an alternative embodiment of a cartridge, according to the invention.
FIG. 8 is an elevational schematic view, showing a water delivery spout that may be engaged with the filter cartridge shown in FIG. 7.
FIG. 9 illustrates an elevational view partially in section, of the adapter included in the filter cartridge structure shown in FIG. 7.
FIG. 9A illustrates a fragmentary cross-sectional view of an alternative fluid inflow port and adapter for a filter cartridge.

FIGS. 6, 7, and 8 depict the components of an alternative embodiment of a water filter faucet alternatively defined as a water filtration device, according to the invention. FIG. 6 shows the alternative faucet body 100, FIG. 7 shows the alternative water filter cartridge 200, and FIG. 8 shows a water delivery spout 400 that may be alternatively defined as a water directing or water discharge spout. The spout has an inlet portion 410 with seals 411 for a firm watertight connection with the cartridge outflow port socket fitting 235. The faucet body 100 has a water flow control valve 110, a fluid outflow passage 120, and a socket fitting 135 notably different to that shown and described in FIG. 1. The outflow port 130 is shown having a cylindrical socket fitting 135 with a slightly flared outer opening for easy insertion of the stem 300. The faucet body is a filtered water faucet body alternatively defined as a water filter faucet body. The faucet body is shown in conjunction with a mounting surface of a sink 600 having a circular opening 650 therethrough originally formed for a sink faucet spray attachment. The vertically oriented cylindrical socket fitting 135 may have an ID (inner diameter) of ⅜ inch and a depth of about 1 inch. The faucet body and shank 150 may be formed as an integral whole from Acetal using an injection molding process. Alternatively, the whole unit may be formed from lead free brass or stainless steel using a drop forge manufacturing method. The outflow port 130 may have an OD (outer diameter) of about 1⅛ inch and a generally flat frontal annular surface 138 to fit and support the corresponding cartridge 200 inlet end 220. The filter cartridge shown in FIG. 7 is a modified inline filter similar to that shown and described in FIG. 2 with exception for the fluid inflow port 221. The inflow port 221 is shown having a female pipe threaded fitting. The alternative stem 300 is shown best as a separate piece in FIG. 9. The stem 300 is adapted to fit the cartridge threaded inflow port 221. The stem 300 has a head portion 320 and a stem portion 330. The stem portion is configured to be inserted in a push-in manner directly into the faucet socket 135 for removable, swivable, and sealed engagement. The head portion 320 has an external pipe taper thread 324 for a firm watertight connection with the cartridge 200 inflow port 221 threaded fitting 226. The head 320 additionally has a collar 325 externally shaped for engagement with a wrench for threading the stem 300 into the filter cartridge inflow port 221 threaded fitting 226 during the assembly process. As shown in FIG. 9, the stem 300 may be formed from Acetal in an injection molding process or alternatively from nylon or polypropylene, and includes an annular notch or groove 331 and a sealing ring 332. The groove or notch 331 may optionally receive a latchkey 121 (shown in FIG. 11) representing a means for locking the releasable stem 300 in place when inserted into the faucet body socket 135. The annular groove or notch may also optionally receive an additional resilient sealing ring (not shown) for increasing the frictional engagement holding the stem 300 and the filter cartridge in place in the upright position. The sealing ring may have many forms known in the art and may be formed from many resilient sealing materials known in the art. In the preferred O-ring form as shown, the sealing ring is made from rubber defined as Buna-N. Alternatively, the sealing ring may be integrally manufactured with the stem portion 330.

Figure 9B:
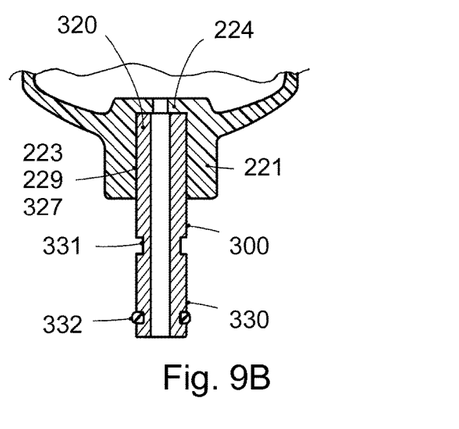
FIG. 9B illustrates a fragmentary cross-sectional view of an alternative fluid inflow port and an adapter for a filter cartridge.

FIGS. 9A and 9B illustrate additional embodiments of the connection between the stem head portion 320 and the filter cartridge fluid inflow port 221, in cross-sectional view. In FIG. 9A, the filter cartridge inflow port 221 shown in a larger scale, is almost identical to that shown in FIG. 7 having the female pipe threaded fitting 226. A reduction fitting 222 is provided as a separate element with external pipe taper threads and a smooth inner cylindrical surface for effectively reducing the opening diameter of the threaded inflow port 221. The smooth inner cylindrical surface of the reduction fitting 222 closely fits the head portion 320 of the stem 300 forming a secure, watertight connection. The tubular stem 300 has an annularly raised stop ring 326 disposed between the head portion 320 and the stem portion 330. The stop ring 326 limits the depth of insertion of the head portion 320 into the reduction fitting 222. The stem portion 330 is identical to that as shown and described in FIG. 9.

Referring now to FIG. 9B, the filter cartridge inflow port 221 also shown in a larger scale, is modified from that shown in FIGS. 7 and 9A to overcome the need for the separate reduction fitting 222 and the stop ring 326 about the stem 300. In FIG. 9B the inflow port 221 has a receiving socket 223 with a reduced inner diameter of about ⅜ inch, with a smooth inner cylindrical wall 229 and an inner shoulder 224. The corresponding head portion 320 has a suitable smooth outer surface for a press-fit connection with the fluid inflow port receiving socket 223. The reduced inner diameter of the receiving socket 223 is pre-sized for a press-fit, watertight connection between the receiving socket's 223 smooth inner cylindrical wall 229 and the smooth outer wall 327 of the head portion 320. The inner shoulder 224 supports the head portion 320 and prevents the stem from being pushed further into the filter's interior media chamber 215 during the assembly process. The stem portion 330 is identical to the one depicted in FIGS. 9 and 9A. Alternatively, the head portion 320 may have another type of watertight connection with the socket 223 known in the art, for example sonically welded, spin welded, or glued.

Figure 10:
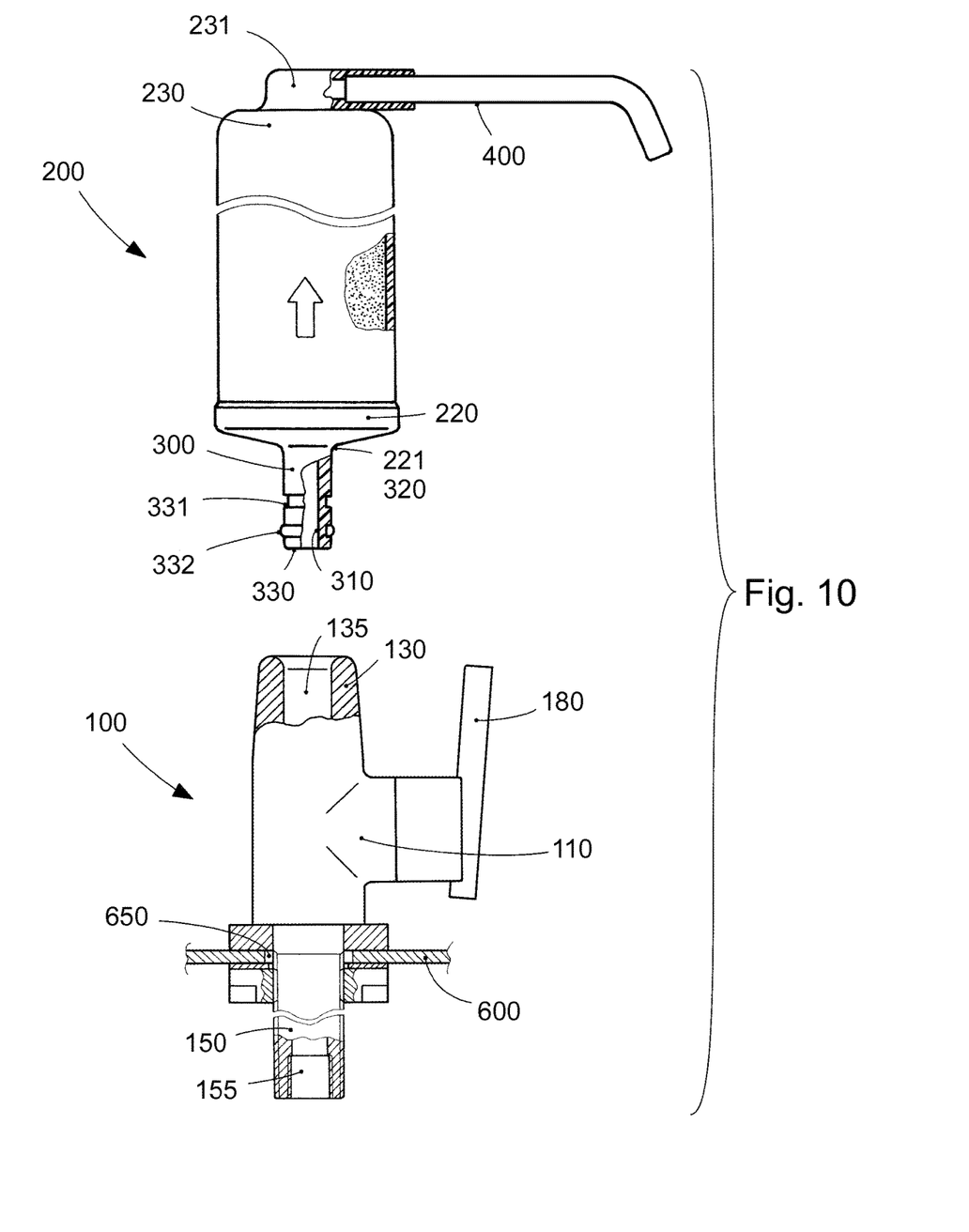
FIG. 10 is an exploded schematic view, showing a water filter faucet that includes an alternative filter cartridge, according to the invention.

FIG. 10 depicts an alternative exemplary embodiment of a water filtration device according to the invention. The water filtration device shown in exploded view comprises generally two components: a faucet body 100 and a disposable inline filter cartridge 200. The faucet body is similar to that shown and described in FIG. 6. The faucet body is the body of a commercially available countertop faucet used to dispense filtered water from the under-counter water filtration devices. Examples of such standard dispensing faucets include the Ecopure WHEFSAT or Hydro System International series F9, F9AG, or F977. The cylindrical socket fitting 135 of the faucet body outflow port 130 is commonly provided for fluid engagement with a standard size ⅜ inch diameter tubular faucet spout. The faucet without the associated water spout may be adapted for new use as a component of the invented water filtration device according to the present invention. The inline filter cartridge's second end 230 and the fluid outflow port 231 are identical to that shown and described in FIG. 7. The water delivery spout 400 is shown engaged with the cartridge fluid outflow port 231 and may be provided separately as a loose part, or permanently attached to the outflow port. The stem 300 is shown having an axially elongated tubular form and being integrally formed with the cartridge's first end 220 in an injection molding process made of polypropylene. The stem comprising a sealing ring 332 has a predetermined outer diameter of ⅜ inch and a length of about one inch for a watertight, swivable, and frictionally releasable engagement with the cylindrical socket fitting 135 of the faucet body outflow port 130. The frictional and swivable connection allows for easily directing the spout 400 in the desired convenient position and for replacing the cartridge when desired in the simple pull-out and push-in manner.

Figure 11:
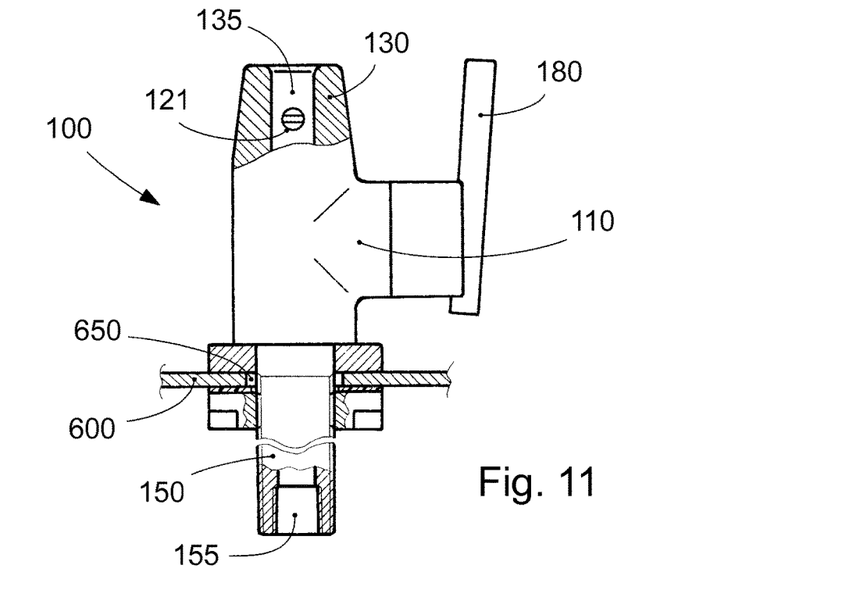
FIG. 11 is an elevational view fragmentary in section, of a water faucet body that may be coupled with the filter cartridge embodiment illustrated in FIG. 12 to form a water filter faucet.
Figure 12:
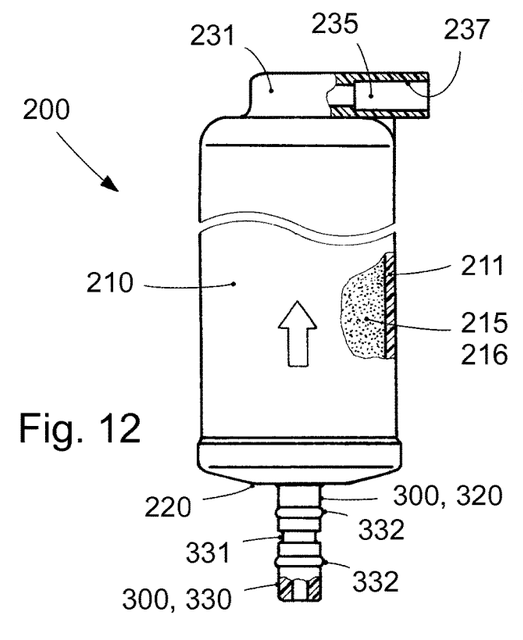
FIG. 12 is an elevational view partially in section, showing an alternative embodiment of a water filter cartridge, according to the invention.
Figure 13:
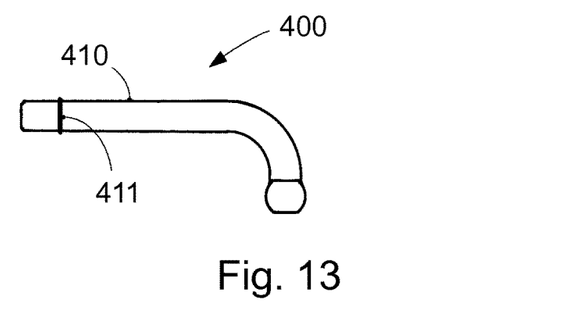
FIG. 13 is an elevational view, showing a water delivery spout that may be engaged with the filter cartridge of FIG. 12.

FIGS. 11, 12, and 13 depict the components of an alternative embodiment for a water filtration device, according to the invention. FIG. 11 shows a faucet body 100, FIG. 12 shows an inline filter cartridge 200 having an inflow port in one end and an outflow port in a second opposite end, and FIG. 13 shows a water delivery spout 400. The faucet body 100 in FIG. 11 is similar to that shown in FIGS. 6 and 10 with the addition of an optional latchkey 121. The latchkey 121 may be embodied as a spring-loaded key within a hole formed through the side wall of the faucet body outflow port 130. The latchkey 121 interlocks with the annular notch or groove 331 of the stem 300 when the stem is inserted into the socket fitting 135. With the stem 300 locked by the latchkey 121, the filter 200 remains swivable and releasably engaged with the faucet body 100, and may be readily released by unlocking the latchkey 121. The inline filter cartridge 200 is identical to that shown and described in FIGS. 7 and 10 with the exception that the stem portion 330 has a second sealing ring 332. The notch 331, alternatively defined as a groove, may optionally receive a third sealing or securing means for increasing the frictional engagement holding the stem 300 in the faucet socket 135. The stem 300 may be secured in the cartridge inlet end 220 by being press-fit, glued, welded, manufactured as an integral whole with the inlet end 220 using an injection molding process, or being otherwise permanently engaged in any of many available methods known in the art. The water delivery spout inflow end 410 has an optional annular sealing ring 411 that may be integrally formed with the spout inlet end 410 or otherwise may be a separate sealing ring. The spout 400 may be formed of a metal or plastic tubing. The water delivery spout may be attached to the cartridge outflow port socket fitting 235 or provided as a loose part for final assembly.

Figure 14:
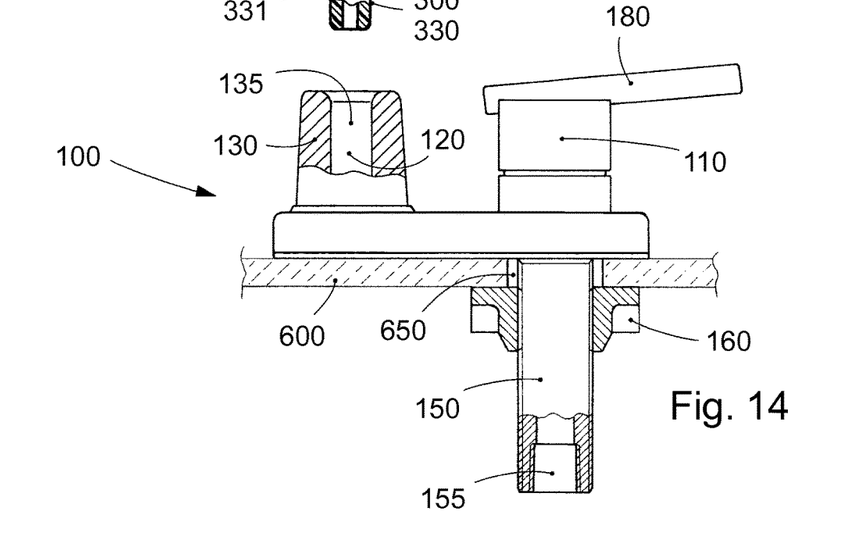
FIG. 14 is an elevational schematic view partially in section, of a water faucet assembly that may be coupled with the filter cartridge illustrated in FIG. 15 to form a filter faucet.
Figure 15:
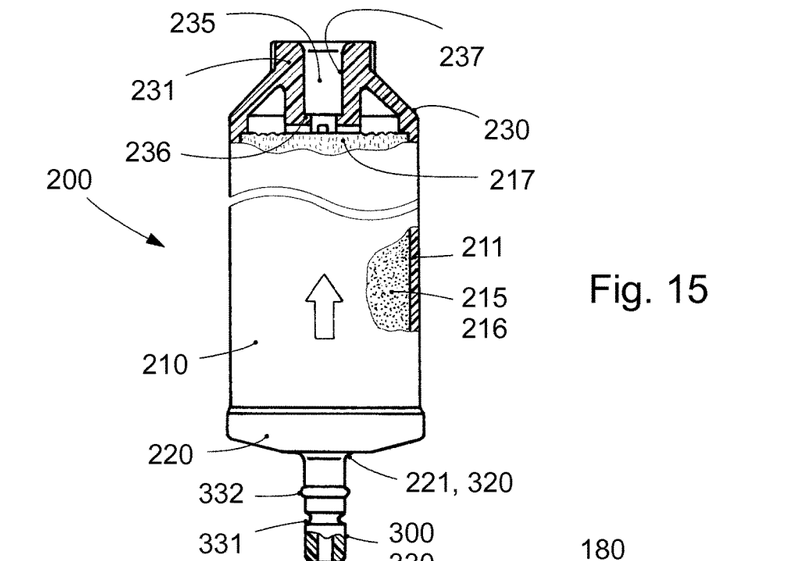
FIG. 15 is an elevational view partially in section, of a filter cartridge suitable to be coupled with the faucet body shown in FIG. 14, according to the invention, Sheet 5.
Figure 16:
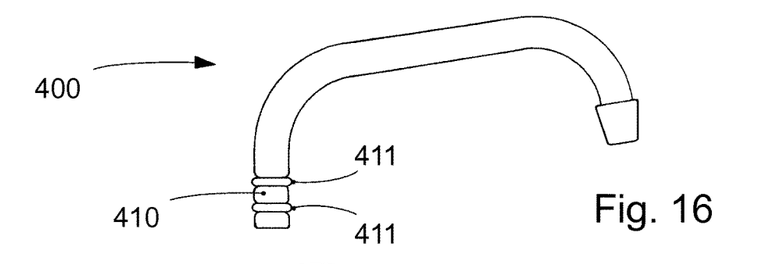
FIG. 16 is a schematic plan view showing a water delivery spout that may be engaged with the filter cartridge shown in FIG. 15.

FIGS. 14, 15, and 16 depict an exemplary kit for forming an alternative water filter faucet, alternatively defined as a water filtration device, according to the invention. FIG. 14 shows an alternative faucet body, FIG. 15 shows an inline filter adapted to be used as a cartridge for the inventive filter faucet and FIG. 16 shows an alternative water delivery spout 400. The faucet body 100 in FIG. 14 is shown having a generally horizontal configuration to decrease the body height. A fluid flow control valve 110 and a fluid outflow port 130 are incorporated into the faucet body. The fluid outflow port 130 has a cylindrical socket fitting 135 similar to that shown and described in FIGS. 6, 10, and 11.

The inline filter cartridge 200 in FIG. 15 is similar to that shown and described in FIGS. 2, 7, 10, and 12 with the notable exception for the second end 230. The inlet stem 300 extending from the first inlet end 220 is also similar to that shown and described in FIGS. 9B, 10, and 12. The stem 300 has a sealing ring 332 and an annular groove 331 suitable for receiving an optional O-ring to increase the frictional engagement between the cylindrical wall of the socket fitting 135 and the stem 300. In FIG. 15, the filter cartridge second end 230 is shown having a vertically oriented socket fitting 235. The socket fitting has a smooth cylindrical inner contact surface 237 to receive the water delivery spout inflow end 410 depicted in FIG. 16. The spout 400 inflow end 410 has two sealing rings 411 for a frictional and watertight connection with the cartridge socket fitting 235. The socket fitting 235 further includes an inner abutment 236 for supporting the faucet spout 400 and limiting the depth of insertion of the spout inflow end 410 into the interior media chamber 215 containing water treatment media. The cartridge's second end socket fitting 235 has a predetermined ID of about ⅜ inch and depth of about one inch. The spout's 400 inflow end 410 is sized to be inserted into the socket 235 in a generally push-in manner. The water delivery spout 400 is swivable, and is sealingly and releasably engaged with the filter cartridge outflow port fitting 235.

Figure 17:
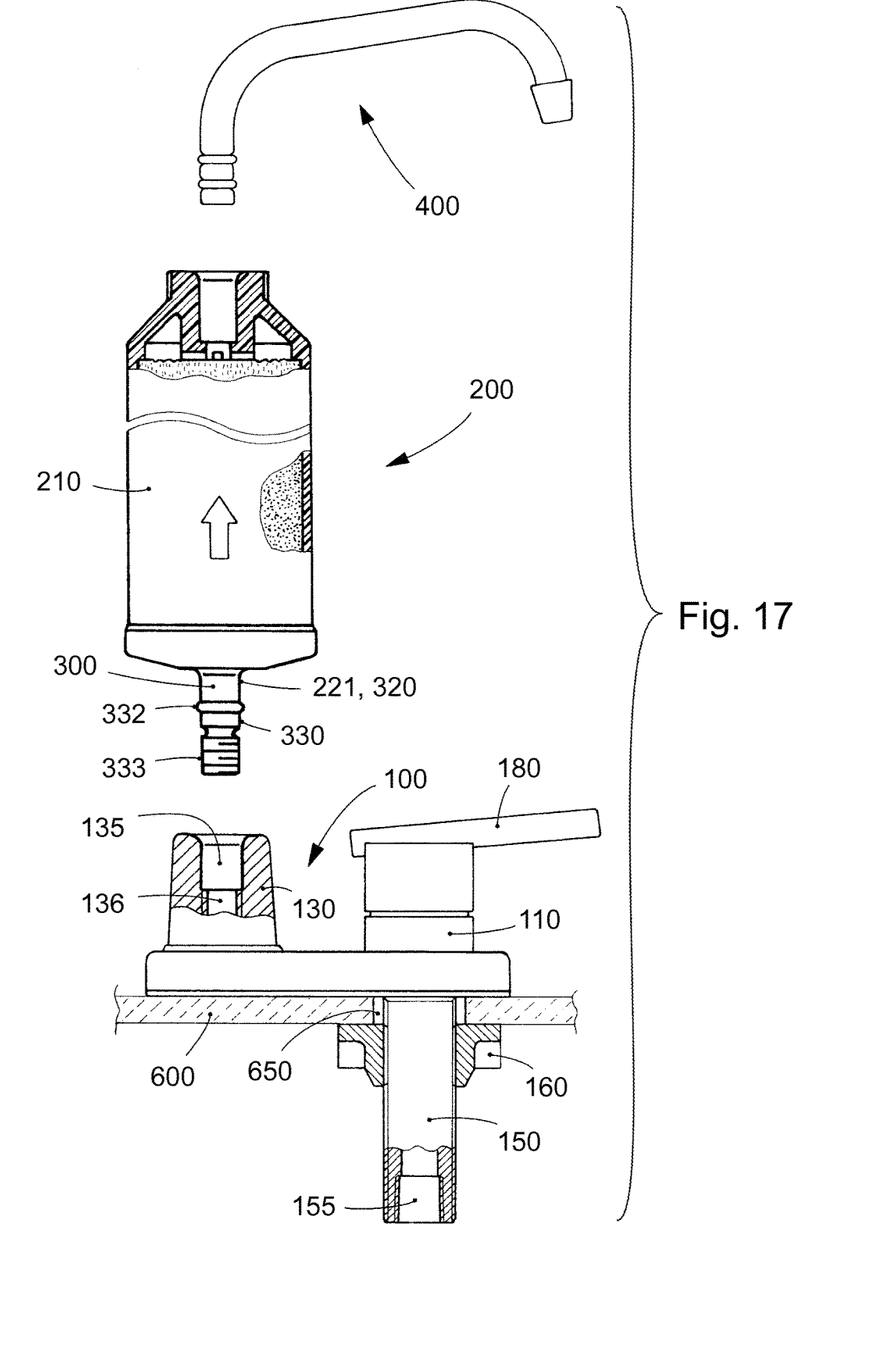
FIG. 17 is an exploded schematic view showing an alternative water filter faucet faucet, according to the invention.

FIG. 17 depicts an alternative exemplary embodiment of a water filter faucet, alternatively defined as a water filtration device, according to the invention. FIG. 17 shows the combination of a faucet body 100, an inline filter 200 modified and/or adapted to be used as a cartridge for the invented filter faucet, and a water delivery spout 400. The water filtration device is shown in an exploded schematic view depicting the alternative components. The faucet body 100 is almost identical to that shown and described in FIG. 14. A notable exception is the socket fitting 135 which has an inner threaded portion 136 shown in partial cross-sectional view of the faucet outflow port 130. The cartridge 200 is almost identical to that shown and described in FIG. 15. A notable exception is the stem 300 having a threaded portion 333 to provide cooperatively interlocking engagement with the inner threaded portion 136 of the faucet socket fitting 135. Other forms of cooperatively interlocking engagement known in the art may be alternatively provided, such as a bayonet engagement (not shown).

Figure 18:
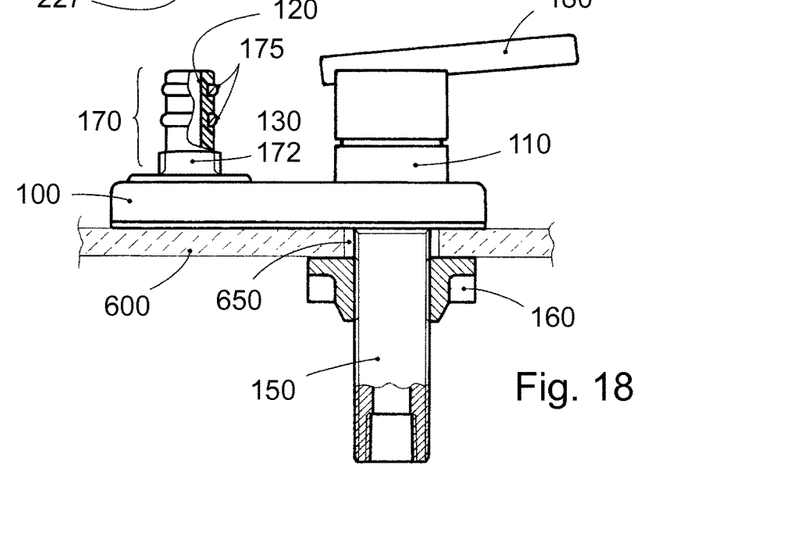
FIG. 18 is an elevational view partially in section, of a water faucet body which may be coupled with the filter cartridge illustrated in FIG. 19 to form a water filter faucet.
Figures 19, 20:
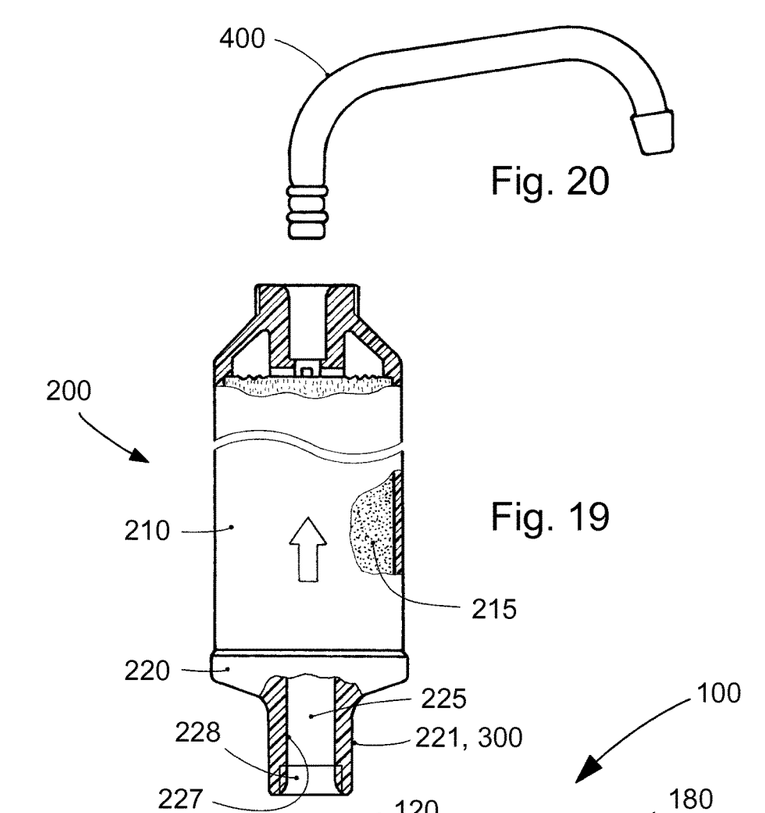
FIG. 19 is an elevational view fragmentary in section, showing an alternative embodiment of the filter cartridge, according to the invention.
FIG. 20 is a schematic plan view showing a water delivery spout, which may be engaged (coupled) with the filter cartridge of FIG. 19.

FIGS. 18, 19, and 20 depict the components of an alternative embodiment for a water filter faucet, according to the invention. FIG. 18 shows a faucet body 100, FIG. 19 shows an inline filter adapted to be a cartridge for the inventive filter faucet, and FIG. 20 shows a water delivery spout 400 for the inventive filter faucet. The depicted components are similar to that shown in FIG. 17 with a notable exception for the connection between the filter cartridge inlet and the faucet body outlet. The connection has a generally reversed arrangement to that shown in FIG. 17. As shown in FIG. 19 the cartridge 200 inlet end 220 has an axially extended inflow port 221 comprising a socket fitting 225 having a cylindrical inner wall 227. The cylindrical socket fitting 225 has an inner diameter (ID) of about ⅜ inch and a length of about one inch, and is formed as an integral whole with the cartridge first end 220 made from polypropylene using an injection molding process.

Referring now to FIGS. 18 and 19, the faucet body outflow port 130 is configured correspondingly to the cartridge 200 inlet fitting 225, to be swivable and releasably and sealingly engaged with the fitting 225. The corresponding fitting as shown in FIG. 18 in partial cross-sectional view has the form of a cylindrical stem 170 having a water outflow passage 120 therein. The stem is permanently engaged with the faucet body 100 in the manufacturing process. The stem 170 is shown having two annular sealing rings 175 frictionally co-acting with the socket 225 cylindrical contact surface 227. In an alternative embodiment, the cylindrical socket 225 may further have an extra threaded portion 228, and the stem 170 may have a corresponding threaded portion 172 for reliably securing the cartridge in an upright position. The extra threaded engagement prevents water flow pressure from pushing and disconnecting the cartridge 200 from the stem 170 when water is introduced into the filter cartridge. The water delivery spout 400 shown in FIG. 20 is identical to that shown and described in FIG. 16.

Figure 21:
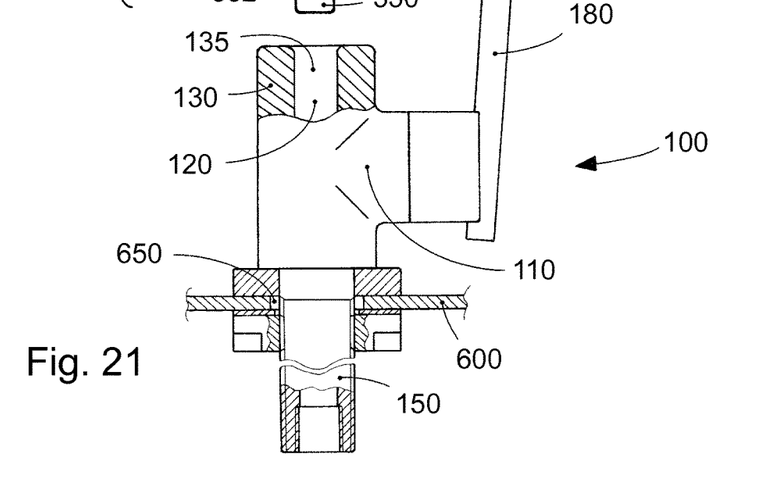
FIG. 21 is an elevational schematic view partially in section, of a water faucet body which may be coupled with the adapter and filter cartridge shown in FIG. 22, according to the invention.
Figure 22:
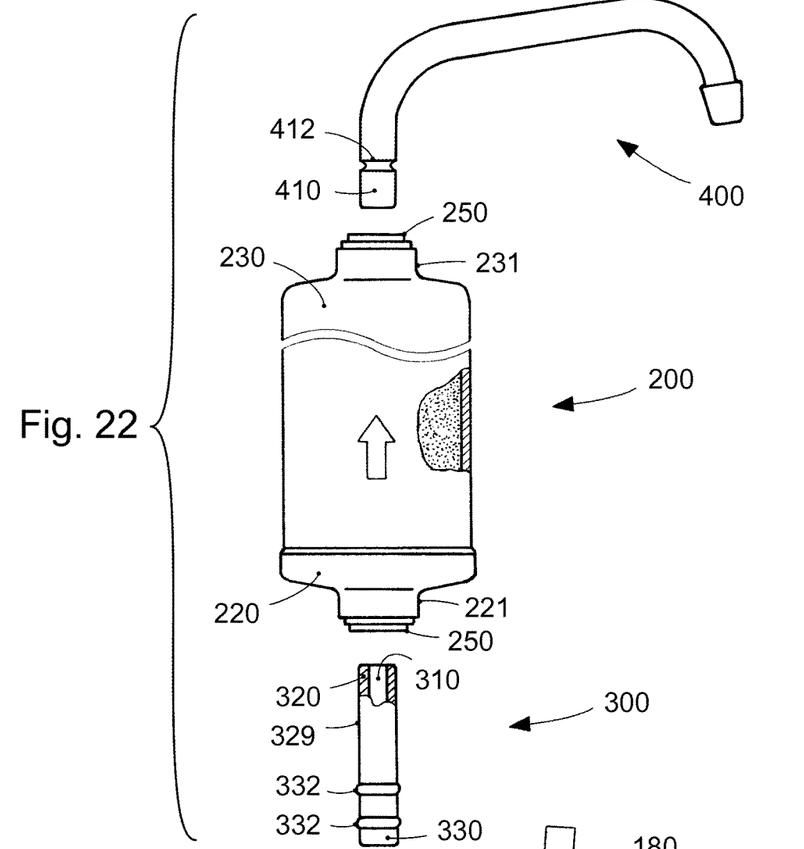
FIG. 22 is an exploded view showing a replacement kit for a water filter faucet, according to the invention.
Figure 24:
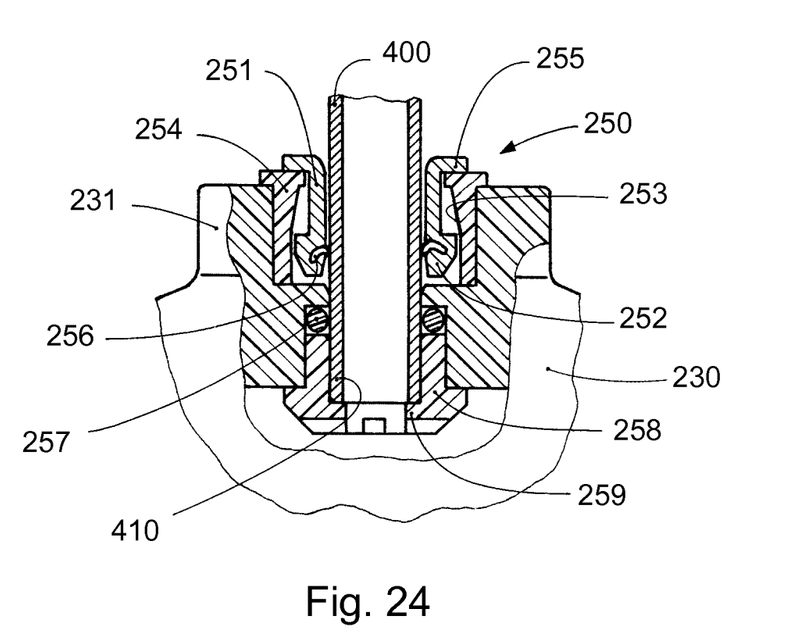
FIG. 24 is a fragmentary cross-sectional view of a filter cartridge fluid port, comprising a push-to-connect fitting, suitable for implementation with the filter cartridge first end for receiving the adapter shown in FIG. 22 and for implementation with the filter cartridge second end for receiving the faucet spout shown in FIG. 23, according to the invention.

FIGS. 21 and 22 depict an alternative water filter faucet's components according to the invention. FIG. 21 shows a faucet body 100. FIG. 22 in an exploded view, shows an inline filter cartridge 200, a connection stem 300, and a water delivery spout 400. The components shown in FIG. 22 constitute an example of a filter replacement kit for a water filtration device, according to the invention. The faucet body 100 shown in FIG. 21 is identical to that shown and described in FIGS. 6 and 10, and similar to that shown in FIG. 11. The inline filter cartridge 200 is similar to that shown and described in FIGS. 2, 10, 15 and substantially equivalent to the Omnipure Filter Company inline K-series filters comprising at both ends 221, 231 a push-in quick connect fitting 250. An example of a quick-connect tube fitting structure is shown in FIG. 24. The stem 300, which in assembly connects the cartridge 200 and the faucet body 100, is shown in FIG. 22 in partial cross-sectional view having an axially tubular or cylindrical form. The connecting stem 300 has two oppositely arranged open ends 320 and 330 including a passage 310 for fluid flow. One end of the stem 300 is the proximal end 320 alternatively defined as a head for a generally fixed connection with the inline filter inflow port 221. The other end of the stem 300 is the distal end 330 alternatively defined as a stem portion for operatively co-acting with the faucet body socket fitting 135. The proximal end or head 320 is in tubular form having a smooth cylindrical outer contact surface suitable for a push-in connection with the quick-connect tube fitting 250 of the inline filter inflow port 221 (shown best in an exemplary embodiment in FIG. 24). The distal end 330 is substantially in tubular form having a smooth outer cylindrical surface and two sealing rings 332. The sealing rings are identical to those shown and described in FIG. 9. The distal end 330 is pre-sized to be inserted in a push-in manner directly into the faucet body socket fitting 135 having a predetermined inner diameter and depth for releasable, swivable, and watertight engagement. The stem 300 is a plastic stem formed from Acetal using an injection molding process. The two sealing rings 332 incorporated in the stem 300 form the frictional engagement with the faucet socket fitting 135.

Figure 23:
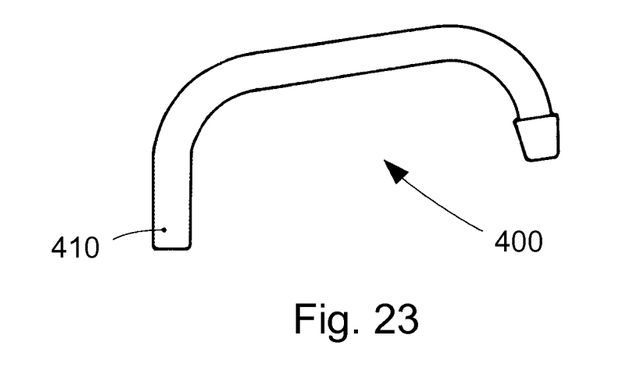
FIG. 23 is a plan view showing a water delivery spout, which may be engaged with the filter cartridge outflow port fitting shown in FIG. 24.

FIG. 23 depicts an alternative water delivery spout 400 for co-acting with a quick-connect type of fitting, of which one exemplary structure is shown in FIG. 24. Such a fitting for receiving the faucet spout inlet end 410 shown in FIG. 23 may be incorporated in the fluid outflow port 231 of the inventive filter cartridge's second end 230. The faucet spout 400 is similar to that shown and described in FIG. 22, without the optional annular groove 412. The exemplary quick-connect tube fitting 250 shown in FIG. 24 comprises a tube locking mechanism for locking the spout's tubular inflow end 410 in the socket. This type of tube locking mechanism is commonly known as a push-in, push-to-connect, or a quick-connect tube fitting. The fitting, as shown, comprises a collet 251 having resilient arms 252 arranged to cooperate with a cam surface 253 of the surrounding bushing 254. The cam surface 253 tapers in the axial direction such that as the spout inflow end 410 is pulled outward, the frictional engagement between the spout inflow end 410 and the collet 251 pulls the collet outward from the fitting. As the collet 251 is pulled outward, the resilient arm 252 of the collet slides along the inner cam surface 253 of the bushing 254 with inward radial movement, increasing the frictional force of the collet arms 252 against the spout inflow tube 410. The tightened grip of the collet 251 firmly holds the tubular spout inflow end 410 in place. The spout inflow end 410 may be withdrawn by pushing the collet flange shoulder 255 inward into the socket, thereby allowing the arms 252 to move radially outward, resulting in decreased frictional force against the spout inlet cylindrical surface, allowing the spout end to be withdrawn. The locking ability of the collet 251 may be optionally enhanced by embedding a gripping element 256 or teeth into the collet arms 252. For a spout inflow end 410 with a metallic or chromed surface, it is preferable for the collet arms 252 to be provided without any sharp metal projections 256 or teeth, which may cut into and damage the external sealing surface of the spout inflow end 410. Instead, the spout inflow end 410 may be provided with an annular groove 412 (FIG. 22) for co-acting with the smooth collet gripping teeth 256. The gripping teeth 256 may be sharp and work well if the spout inflow end 410 is made of plastic tubing material as a disposable spout. To form a watertight connection, an annular sealing ring 257 is provided to frictionally and sealingly engage the spout end 410 which has a smooth cylindrical outer surface. The sealing ring 257 is supported with an inner bushing 258 provided with an inner abutment 259 for supporting and limiting insertion of the spout inflow end 410. Alternatively, the filter cartridge outflow port 231 may be provided with other similar socket fitting structures, for example as described in U.S. Pat. Nos. 4,005,883, 4,606,783, and several others. U.S. Pat. No. 4,606,783 provides a threaded adapter having a socket fitting comprising a collet locking mechanism, which may be fit into the filter cartridge's 200 outflow port 231. The quick-connect fitting has an internal pre-sized socket diameter just sufficient to accommodate the faucet spout inflow end 410 of a predetermined external diameter, preferably ⅜ inch, slidably inserted therein.

Unique advantages, superior features and many inherent benefits can now be appreciated. For example, when the valve is closed, the filter cartridge is not subjected to any water line pressure and may be readily replaced in a simple pull-out and push-in manner without any tools. The pull-out and push-in manner mounted cartridge may be quickly and easily removed and stored in a refrigerator when not in use, thus decreasing any bacterial growth within the cartridge's interior and the water delivery spout. A low-cost reliable inline water filter may be easily adapted for new use as a cartridge for the inventive water filter faucet. The cartridge may possess any of the numerous possible forms wherein height, diameter, and general shape are non-specific. A low-cost plastic spout may be integrated or otherwise provided with the replaceable cartridge allowing for the cartridge and spout to be disposed together. The inventive water filter faucet substantially includes only two components; the filter cartridge and the faucet body, thereby minimizing the manufacturing and maintenance cost. A reliable low-cost plastic or metal faucet body may be utilized. In many further various embodiments of the present invention, the faucet body may include a means for displaying water quality or sending a signal when the cartridge is at the end of its life and needs to be replaced. The faucet body may have any number of fastening means to affix it to the sink or countertop that are known in the art. The faucet body fastening means may be combined with the water inlet means for a water supply connection. The valve constructed for the purpose of permitting and terminating water flow through the cartridge may have any number of embodiments known in the art. The valve actuating means, being generally a handle or knob, may have many other design forms known in the art including for example an electronic solenoid actuator or electromagnetic actuator controlled by a timer.

The terms, dimensions, and expressions employed in the foregoing specification are used herein as terms of description and not of limitation, and there is no intention in the use of such terms, dimensions, and expressions of excluding equivalents of the features shown and described herein.

It should be understood that further various changes and modifications to the presently preferred embodiments described herein will be apparent to those skilled in the art. Such changes and modification may be made without departing from the spirit and scope of the present invention and without diminishing its attended advantages. It is, therefore, intended that such changes and modifications be covered by the appended claims.

What is claimed is:

1. A water filtration device being generally a filter faucet for use in conjunction with a mounting surface generally on a sink or countertop, said mounting surface comprising a mounting hole therethrough; said water filtration device comprising:
    a water faucet body including a generally upright oriented water outlet that defines a socket fitting, said body being mountable on the mounting surface and comprising a water inlet means and attachment means operatively extending downwardly through said mounting hole for a water supply connection when installed and for fastening to the mounting surface;
    a water filter operatively attached to said socket fitting being substantially an inline water filter having an inflow port in a first end and an outflow port in a generally opposite second end;
    a water delivery spout having an inlet end attached to the filter outflow port;
    said water filter comprising an elongated hollow tubular stem extending outwardly from said filter inflow port configured and sized to be sealingly and frictionally engaged, and slidably attached to said faucet body socket fitting in a generally push-in manner, said filter outflow port comprising a fitting for receiving said inlet end of said water spout; and
    wherein said filter is swivable in relation to said faucet body while maintaining a watertight connection;
    whereby the filter is slidably and frictionally engaged with said faucet body socket fitting, whereby said filter is readily replaceable in a pull-out, push-in manner, whereby said filter is easily accessible for quick and easy replacement and thus may be easily removed and stored in a refrigerator when not in use thereby decreasing bacterial growth within the filter and spout, and whereby said filter is swivable about its vertical axis while maintaining a watertight connection with the faucet body enabling said water spout affixed to said filter outflow port to be readily and conveniently positioned in a desired direction.

2. The water filtration device of claim 1, wherein said faucet body is a filtered water faucet body or water filter faucet body having a generally upright oriented spout socket fitting.

3. The water filtration device of claim 1, wherein said water filter first end is integrally formed with said inflow port and said stem.

4. The water filtration device of claim 1, wherein said filter outflow port is a push-in quick connect tube fitting or socket fitting, whereby said water delivery spout may engage said outflow port fitting in a simple push-in manner.

5. The water filtration device of claim 1, wherein said filter outflow port has a socket fitting comprising a cylindrical inner wall and an abutment supporting and limiting the depth of insertion of said inlet end of said water delivery spout.

6. The water filtration device of claim 1, wherein said tubular stem comprises one or more sealing rings for operatively co-acting sealingly and frictionally with said faucet socket fitting when fit therein.

7. The water filtration device of claim 1, wherein said tubular stem comprises at least one sealing ring and an externally threaded portion operatively engageable with the faucet body socket fitting having a correspondingly formed threaded portion, whereby said stem is coupled with said faucet socket fitting in a simple push-in manner and further rotary manner, thereby forming a reliable and secure connection.

8. A replacement kit generally for water filtration devices comprising a faucet body including a generally upright oriented socket fitting, said kit comprises:
    a substantially inline water filter having a first end with an inlet port and a generally opposite second end with an outlet port, said outlet port adapted for engaging an inlet end of a water delivery spout, and
    a hollow elongated tubular stem being operatively disposed between said faucet body and said inlet port, configured and sized to be sealingly and frictionally engaged, and slidably attached to said faucet body socket fitting in a generally push-in manner.

9. The replacement kit of claim 8, further comprising a water delivery spout being either attached or not attached to said outlet port of said filter.

10. The replacement kit of claim 9, wherein said water directing spout is a disposable spout formed from a suitable plastic material.

11. The replacement kit of claim 8, wherein both said inlet port and said outlet port comprise a push-in quick connect tube fitting configured as having a cam surface, a collet cooperating with said cam surface, and a sealing ring.

12. The replacement kit of claim 8, wherein said outflow port has a socket fitting comprising a cylindrical inner wall and an abutment supporting and limiting the depth of insertion of said inlet end of said water directing spout into said socket fitting.

13. The replacement kit of claim 8, wherein said stem outer surface comprises one or more sealing rings for frictional and sealing engagement with the faucet body upright oriented socket fitting.

14. The replacement kit of claim 13, further with said stem comprising a threaded portion.

15. The replacement kit of claim 8, wherein said stem defines a female socket having a cylindrical inner wall.

16. The replacement kit of claim 15, wherein said cylindrical inner wall comprises a threaded portion.

17. The replacement kit of claim 8, wherein the inline filter is a disposable water filter.

18. A water filter to be used in conjunction with a water faucet body for forming a water filtration device, said faucet body having a generally vertically oriented water outlet that defines a socket fitting, said filter comprising:
    a watertight shell having a sidewall and generally oppositely arranged first and second ends forming with said sidewall an interior media chamber enclosing a water treatment means;
    an outflow port generally situated in said second end defining a fitting for operatively engaging a water delivery spout;
    an inflow port disposed in said first end;
    a connection means being fixedly or removably attached to the water filter first end inflow port configured and sized to be sealingly and frictionally engaged and slidably attached to said faucet body socket fitting in a generally push-in manner, said filter being swivable in relation to said faucet body when attached while maintaining a watertight connection, wherein the watertight connection between said connection means and said faucet body socket fitting is generally formed by means of slidable frictional engagement; and
    whereby the filter being swivable enables the water delivery spout to be readily and conveniently positioned in a desired direction; and
    whereby the filter may be readily removed for easy replacement or temporary storage in a refrigerator when not in use, thereby decreasing bacterial growth within the filter and spout.

19. In a water filtration device comprising a valve assembly being generally a faucet body having a generally vertically configured water outflow port, a water filter having a water inflow port and a generally oppositely arranged water outflow port, and a water spout;
    in which the water filter is attached to the faucet body outflow port and the water spout is attached to the water filter outflow port, the improvement comprising a connection means disposed between said faucet body water outflow port and said water filter inflow port, configured and sized to be sealingly and frictionally engaged and slidably attached and detached in a generally push-in and pull-out manner, wherein the filter is swivable in relation to said faucet body while maintaining a watertight connection;
    whereby the water spout being affixed to the filter outflow port may be readily and conveniently positioned in a desired direction, and the water filter may be readily replaced in a simple pull-out and push-in manner.

20. A water filtration device being generally a filter faucet for use in conjunction with a mounting surface generally on a sink or countertop, said mounting surface comprising a mounting hole therethrough; said water filtration device comprising:
    a water faucet body being mountable on the mounting surface, said faucet body comprising a water inlet means and attachment means operatively extending downwardly through said mounting hole for a water supply connection when installed and for fastening to the mounting surface, said faucet body further comprising a water outlet;
    a water filter having an inflow port in a first end and an outflow port in a second end, said outflow port having an operatively affixed water delivery spout; and
    an elongated hollow tubular stem disposed between and fluidly connecting said filter with said faucet body, said elongated hollow tubular stem being substantially configured for a watertight connection by means of slidable frictional engagement, wherein said filter is swivable in relation to said faucet body while maintaining the watertight connection;
    whereby said hollow tubular stem enables the filter to be readily removed for easy replacement or temporary storage in a refrigerator when not in use, thereby decreasing bacterial growth within the filter and spout;
    whereby the filter being swivable enables said affixed spout to be readily and conveniently positioned in a desired direction.

21. The water filtration device of claim 20, wherein said water filter first end is integrally formed with said inflow port and said elongated hollow tubular stem.

22. The water filtration device of claim 20, wherein said water filter outflow port has a socket fitting comprising a cylindrical inner wall and an abutment supporting and limiting the depth of insertion of the attached water spout.

23. The water filtration device of claim 20, wherein said elongated hollow tubular stem comprises one or more sealing rings for operatively co-acting sealingly and frictionally with said faucet body water outlet.

24. The water filtration device of claim 20, wherein said water faucet body is the body of a filtered water faucet or a water filter faucet wherein the faucet body water outlet defines a socket fitting for a spout.

25. The water filtration device of claim 20, wherein said faucet body water outlet is configured having a socket fitting and said elongated hollow tubular stem comprises at least one sealing ring and an externally threaded portion operatively engageable with said faucet body water outlet socket fitting having a correspondingly formed threaded portion, whereby said tubular stem is engageable with the faucet body socket fitting in a simple push-in and further rotary manner, thereby forming a reliable and secure connection.

* * * * *